Sept. 15, 1959 G. L. WILLIAMS 2,904,328
MULTIPLE-RATE COMPRESSIBLE LIQUID SPRING
Filed Oct. 26, 1955
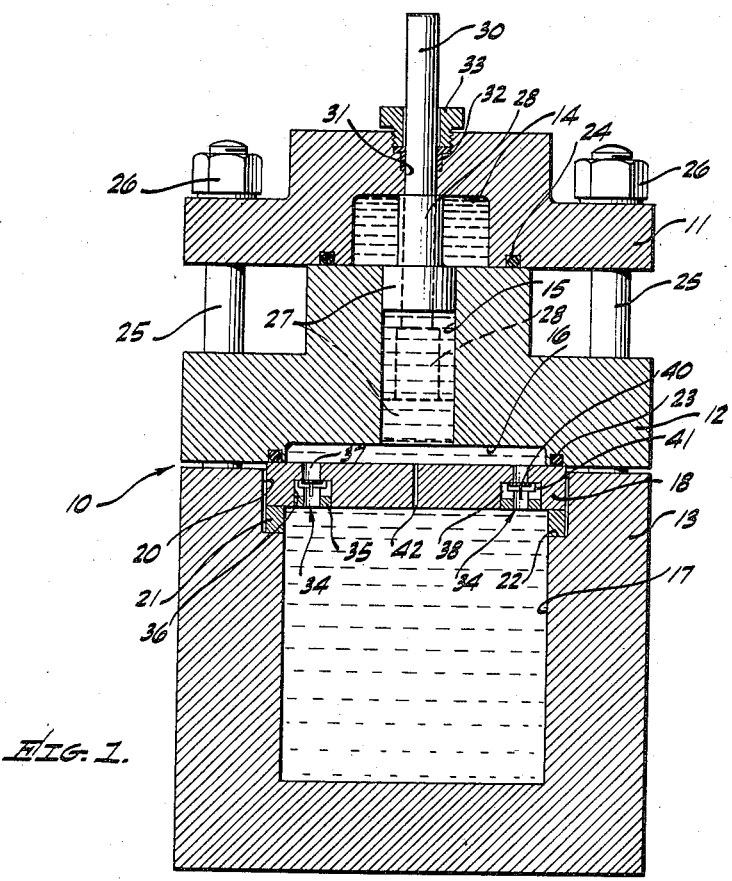
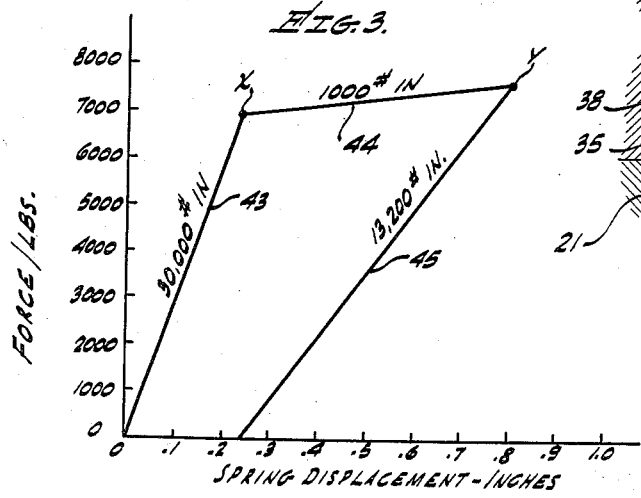
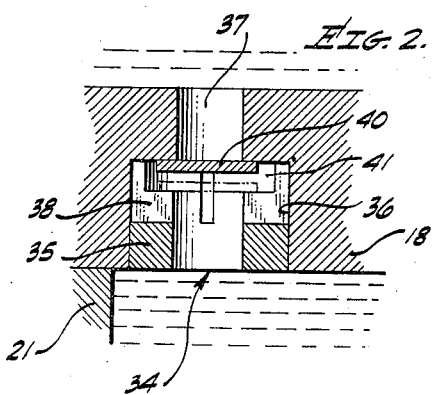
INVENTOR.
GEORGE L. WILLIAMS,
BY
Henry Heyman
ATTORNEY

United States Patent Office 2,904,328
Patented Sept. 15, 1959

2,904,328

MULTIPLE-RATE COMPRESSIBLE LIQUID SPRING

George L. Williams, Los Angeles, Calif., assignor to Hughes Aircraft Company, Culver City, Calif., a corporation of Delaware Application October 26, 1955, Serial No. 542,917

4 Claims. (Cl. 267—1)

The present invention relates generally to springs and relates more particularly to multiple rate compressible liquid type springs for use in instances wherein large forces acting over short distances are encountered.

While compressible liquid type springs have been known heretofore, the previously available arrangements have been limited in their application. These previous liquid springs have had generally linear characteristics and were not adaptable to different situations requiring nonlinear operating characteristics. For example, in rebound shock devices utilized for test purposes, it is desirable that the force, or acceleration, applied by the spring have a sharp rise followed by a relatively flat plateau and relatively slow return to zero. Mechanical types of springs and other shock absorbing devices are not able to produce the desired result nor are the linear liquid type springs suitable for the purpose.

It is accordingly one important object of the present invention to provide a multiple rate compressible liquid spring having strongly nonlinear operating characteristics.

It is another important object of the present invention to provide a multiple rate compressible liquid type spring employing a plurality of chambers filled with a compressible liquid under pressure.

It is a further important object of the present invention to provide a multiple rate compressible liquid type spring arrangement including in combination therewith novel check valve means employed between at least two liquid filled chambers thereof.

It is still another object of the present invention to provide a spring arrangement employing at least a pair of chambers divided by a movable wall, liquid contained within these chambers being maintained under pressure.

Other and further important objects of the present invention will become apparent from the disclosures in the following detailed specification, appended claims and accompanying drawing, wherein:

Figure 1 is a sectional view showing the multiple rate compressible liquid type spring of the present invention;

Fig. 2 is an enlarged fragmentary sectional view showing details of a check valve employed with a present spring arrangement; and Fig. 3 is a diagram illustrating a typical operating schedule for the present liquid spring arrangement.

With reference to the drawing the compressible liquid type spring of the present invention includes a housing indicated generally at 10. The housing 10 includes an upper or top portion 11, an intermediate portion 12 and a base or lower portion 13. The upper portion 11 has formed therein, a first chamber 14, while the intermediate portion 12 of the housing has an elongated bore 15 therethrough which defines a second chamber within the housing 10. The lower end of the chamber 15 is formed by an enlarged annular recess 16. The base portion 13 of the housing 10 has a recess 17 defining a third chamber, there being a transverse partition 18 disposed within a recess 20 in the upper end of the chamber 17, a spacer ring 21 being disposed between one side of the partition 18 and a shoulder 22 on one end of the recess 20. An upper surface of the partition 18 is adapted for engagement with a lower surface of the intermediate housing portion 12, there being an annular sealing ring 23 disposed in the portion 12 and adapted for engagement with the upper surface of the partition 18. A second annular sealing ring 24 is disposed in an annular groove in the upper housing portion 11 and adapted for cooperation with an upper surface of the intermediate housing portion 12. The various housing portions 11, 12 and 13, the partition 18 and spacer ring 21 are retained in position by means of a plurality of clamping studs 25 and nuts 26, the studs 25 being secured to the base portion 13, extending through the intermediate portion 12, with the nuts 26 being adapted for engagement with an upper surface of the upper housing portion 11.

The chamber 15 has a piston 27 slidably disposed therein and defining a movable wall between the first and second chambers 14 and 15. The piston 27 has an extension portion 28 which is disposed through the chamber 14 and has an end adapted to limit the upward travel of the piston. An operating or output member is defined by a shaft 30 that is connected to the piston 27 and extends through a bore 31 formed axially within the housing portion 11. A packing 32 is retained in position about a shaft 30 by means of a gland 33, which threadably engages the housing portion 11, in order to provide a liquid-tight seal about the shaft 30.

The partition 18, disposed between the second and third chambers 15 and 17, has disposed therein a pair of check valves indicated generally at 34. The check valves 34 are shown in detail in Fig. 2 and include valve retaining members 35 disposed tightly in bores 36 in the lower surface of the partition 18. Reduced diameter passageways 37 communicate between the upper ends of the bores 36 and the recess portion 16 of the chamber 15. The valve retaining members 35 are transversely slotted as at 38, there being disk type valve members 40 disposed in upwardly directed annular recesses 41 in the retaining members 35. The valve members 40 are adapted for cooperation with upper walls of the recesses 36 to occlude the passageways 37 and prevent fluid flow from the third chamber 17 to the second chamber 15, while still permitting free flow from the second chamber 15 to the third chamber 17. The existence of greater pressure in the chamber 17 and a differential across the partition 18 is adapted to maintain the valve disks in closed positions. For a purpose to be hereinafter more fully described, the partition 18 is further provided with an orifice bleed passageway 42 therethrough.

For purposes of the present invention and description thereof, it is assumed that the piston 27 forms a slidable liquid-tight fit within the bore defining the second chamber 15, in order that there may be very little if any fluid flow thereacross. It is further assumed that each of the first, second and third chambers 14, 15 and 17 are sealed and closed chambers except for the communication provided between the second and third chambers by way of the check values 34 and bleed orifice 42. Each of the chambers 14, 15 and 17 are filled with a compressible liquid such as, for example, a silicone material, with this material being installed in chambers 15 and 17 under a pressure in the order of 10,000 p.s.i., for example, and at a pressure of approximately 20,000 p.s.i. in chamber 14. Pressures across the piston 27 are in equilibrium with little or no force being transmitted to the upper wall of chamber 14 by the extension 28.

When downward compressive shock is applied to the shaft 30, the piston 27 will be moved downwardly to compress the liquid in the second and third chambers 15 and 17 by passage from the chamber 15 through the check valves 34 and into the chamber 17. Concurrently, the liquid in the chamber 14 will expand into the upper portion of the bore 15 until the pressure thereof drops to zero, whereafter an evacuated space will be defined in a portion of the chamber 14, with pressure in the chamber 14 thereafter being negligible, and defined only by vapor characteristics of the silicone material contained within this first chamber 14.

It may thus be seen, with reference to the diagram of Fig. 3, that approximately 7000 pounds of force, for example, will be required to displace the piston slightly more than .2 of an inch while additional movement of the piston for approximately .8 of an inch will require force only approximately an additional 500 pounds for a total of 7500 pounds. Thus, the line 43 on the graph will rise to the point X as the piston 27 is being moved downwardly in the bore 15, with the point X being reached when the pressure of the silicone material in the chamber 14 reaches zero. Thereafter, the plateau defined by the line 44 is traversed until a point Y is reached. The line 45 represents a return schedule for the shaft 30 and piston 27, with the check valves 34 serving to trap a quantity of the silicone material in the chamber 17 and to prevent reverse flow to the chamber 15, thus spacing the schedule defined by the line 45 from the schedule defined by the line 43 and preventing return by way of the schedule defined by the lines 44 and 43. Operation of the present device through a complete cycle thereof takes place within a very short period of time, say for example, 20 to 30 milliseconds with the silicone material under pressure in the chamber 17 being thereafter bled to the chamber 15, by way of the orifice in the partition 18, whereby to equalize pressures on each side of the partition 18 and prepare the device for a next cycle.

As shown in Fig. 1, the spacer ring 21, on one side of the partition 18, may be removed, and the ring 21 being placed above the partition 18, whereby effectively to change the volumes of the second and third chambers 15 and 17 respectively in order that different schedules may be followed as may be necessary for particular specific requirements.

Having thus described the invention and the present embodiment thereof, it is desired to emphasize the fact that many modifications may be resorted to in a manner limited only by a just interpretation of the following claims.

What is claimed is:

1. A multiple rate compressible liquid spring device comprising, in combination: a composite housing; first, second and third chambers in said housing; a piston defining a movable wall between said first and second chambers; an output shaft connected to said piston and extending outwardly from said housing; fluid sealing means about said shaft; a partition disposed between said second and third chambers; check valve means carried by said partition, free fluid flow across said check valve means being in a direction from said second chamber to said third chamber; orifice means between said second and third chambers; and a compressible liquid in each of said chambers, said liquid in said first chamber normally at a pressure greater than a pressure of said liquid in said second and third chambers.

2. A multiple rate compressible liquid spring device comprising, in combination: a composite housing; first, second and third chambers in said housing; a piston defining a movable wall between said first and second chambers; an output shaft connected to said piston and extending outwardly from said housing; fluid sealing means about said shaft; an adjustable partition disposed between said second and third chambers; check valve means carried by said partition, free fluid flow across said check valve means being in a direction from said second chamber to said third chamber; orifice means between said second and third chambers; and a compressible liquid under pressure in each of said chambers, said liquid in said first chamber normally being at a pressure greater than a pressure of said liquid in said second and third chambers.

3. A multiple rate compressible liquid spring device comprising, in combination: a composite housing; first, second, and third chambers in said housing; a piston, defining a movable wall between said first and second chambers; an output shaft connected to said piston and extending outwardly from said housing; fluid sealing means about said shaft; a partition disposed between said second and third chambers; check valve means carried by said partition, free fluid flow across said check valve means being in a direction from said second chamber to said third chamber; orifice means between said second and third chambers, said third chamber having a volume greater than a combined volume of said first and second chambers; and a compressible liquid in each of said chambers, said liquid in said first chamber normally being at a pressure greater than a pressure of said liquid in said second and third chambers.

4. A multiple rate compressible liquid spring device comprising, in combination: a composite housing; first, second and third chambers in said housing; a piston arranged for slidable disposition in said housing and defining a movable wall between said first and second chambers; an output shaft connected to said piston and extending outwardly from said housing; fluid sealing means about said shaft; an adjustable partition disposed between said second and third chambers; free floating disc check valve means carried by said partition, free fluid flow across said check valve means being in a direction from said second chamber to said third chamber; orifice means between said second and third chambers, said third chamber, having a volume greater than a combined volume of said first and second chambers; and a compressible liquid under pressure in each of said chambers, said liquid in said first chamber normally being at a pressure greater than a pressure of said liquid in said second and third chambers.

References Cited in the file of this patent

UNITED STATES PATENTS

| 178,275 | Corliss | June 6, 1876 |
| 1,840,178 | Transom | Jan. 5, 1932 |
| 2,570,853 | Pierce | Oct. 9, 1951 |
| 2,723,847 | Hogan | Nov. 15, 1955 |
| 2,793,031 | Hartel | May 21, 1957 |

FOREIGN PATENTS

| 457,730 | Great Britain | Dec. 4, 1936 |